UNITED STATES PATENT OFFICE.

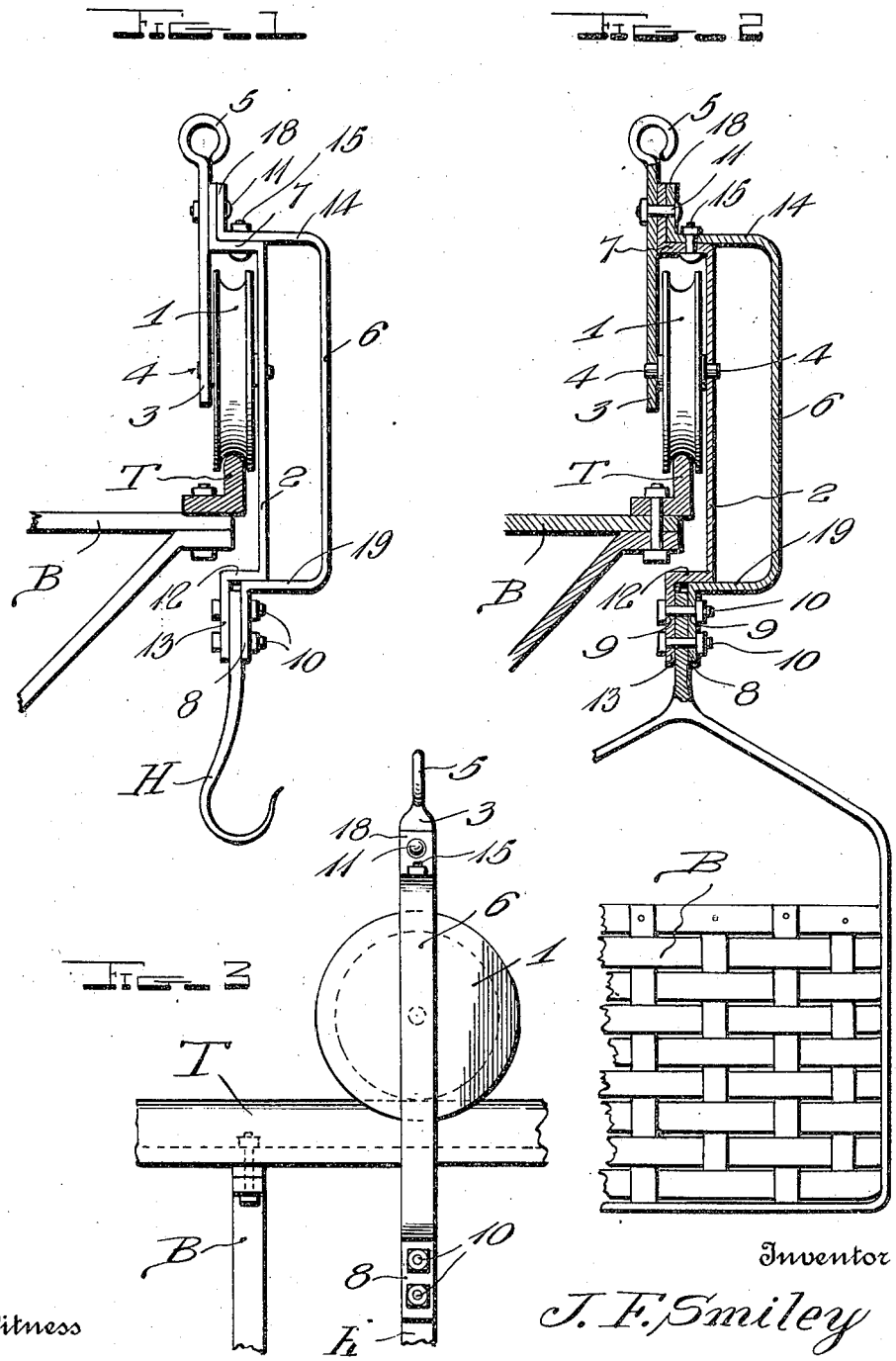

JOHN F. SMILEY, OF DALLAS, TEXAS.

ELEVATED CARRIER.

1,311,018.  Specification of Letters Patent.  Patented July 22, 1919.

Application filed April 10, 1919. Serial No. 289,006.

*To all whom it may concern:*

Be it known that I, JOHN F. SMILEY, citizen of the United States, residing at Dallas, in the county of Dallas and State of Texas, have invented certain new and useful Improvements in Elevated Carriers; and I do declare the following to be a full, clear, and exact description of the invention, such as will enable others skilled in the art to which it appertains to make and use the same.

My invention relates to improvements in carriers adapted to travel on an elevated track of any character for carrying merchandise or any other load from one point to another, and the device is intended primarily for use in stores of the type having a circuitous aisle or passageway along which the purchaser walks with a basket or the like and selects groceries and other supplies from shelves along the passage, finally paying for the products at the exit of the store. In providing a carrier for this purpose, it is highly desirable to employ a handle by the use of which the customer may easily move the carrier and the basket or other container along the track, and in order that the device may be as light as possible, it should be of rather delicate construction. One of the principal objects of the invention is therefore to provide a structure which will meet these demands, novel provision being made whereby the light frame structure is effectively braced by the handle.

A further object is to provide for the attachment of different receptacles, such as baskets, boxes, bags, etc., to the carrier.

With the foregoing in view, the invention resides in the novel features of construction and unique association of parts hereinafter described and claimed, reference being made to the accompanying drawing.

Figure 1 is an edge view of a carrier constructed in accordance with my invention.

Fig. 2 is a vertical section.

Fig. 3 is a side elevation.

In the drawing above briefly described, the numeral 1 designates a wheel adapted to travel upon any preferred type of track T, said track being here shown as formed of angle iron, supported on brackets B, while the wheel 1 is preferably grooved to travel on said track. The wheel 1 is rotatably mounted between the lower end of a relatively short vertical bar 3 and the intermediate portion of a much longer vertical bar 2, the upper end of said bar 3 being preferably provided with an eye 5 by means of which the device may be suspended when removed from the track, while the upper end of bar 2 is extended laterally at 7 and secured to the bar 3 by a bolt 11 or any other preferred fastener. The lower end of bar 2 is bent laterally at 12 and then downwardly at 13 to position its lower extremity directly below the wheel 1 so that when a load is supported by the carrier, the latter will be held in proper upright position. The wheel 1 may be provided with trunnions 4 or any other preferred means for rotatably mounting it between the bars 2 and 3, and all of these parts are of sufficiently delicate construction to be of exceptionally light weight, thus insuring that the device may be easily applied to and lifted from the track.

For moving the carrier along the track I provide a vertical handle 6 and I so mount and construct this handle as to cause the same to act as a brace for the remainder of the device, thus imparting sufficient rigidity thereto, regardless of its light construction. In the present arrangement the handle 6 is spaced outwardly from and parallel with the bar 2, the upper end of said handle being bent laterally inward at 14 and secured by a bolt or the like 15 to the horizontal part 7 of said bar 2, said end then extending upwardly at 16 in contact with the similarly directed upper terminal of the bar 2 and being anchored by the fastener 11 above described. The lower end of the handle 6 is bent laterally inward at 19 under the part 12 of the bar 2 and then extends downwardly at 8 in parallel relation with the lower extremity 13 of the aforesaid bar 2. Any suitable load carrier such as a basket, hook, box, bag or the like, may be secured between the extremities 13 and 8 and for illustrative purposes I have illustrated a hook H in Fig. 1 and a basket B in Fig. 2, either the hook shank or a part of the basket handle being clamped between said extremities by bolts 10 passing through the three parts as shown.

By constructing and attaching the handle in or approximately in the manner shown and described, it acts not only as a handle, but as an effective brace particularly for the comparatively long bar 2, and it will be obvious that the lower ends 13 and 8 of the parts 2 and 6 respectively, may be moved different distances apart, due to the resiliency of the metal of which the device is constructed. It is thus insured that hooks, handles of baskets, etc., of different thicknesses may be easily inserted and held by said ends.

The eye 5 may be employed for supporting the entire device, when not in use, for instance at the entrance of the aisle or passage of a store such as above mentioned, and the customer on entering may remove a carrier from its supporting hook or the like, place it upon the track T, suspend a basket, handbag or the like upon the hook H, and proceed through the store, purchasing the required products and dropping them in the basket or the like. A receptacle such as the basket B may if desired be attached to each carrier instead of the hook. Whenever desired, the handle 6 may be released so that both hands are free to remove merchandise and the like from the shelves. When the exit of the store is reached, the handbag or basket may be removed if the hook H be used and if not the contents of the basket B are removed, and either the customer or attendant will again suspend the device at the store entrance by means of the eye 5, or any other adequate suspending device which may be provided. In order that the carrier may be easily applied to and removed from the track, it is essential that it be of very light construction; in order that it may be readily pushed along the track, it must be provided with a handle; and by providing a handle which will not only perform its true function, but will brace the frame structure, such structure may be of much more delicate and lighter formation than would otherwise be possible. I therefore consider the general arrangement shown of great importance.

If the device is used for instance in a meat market, the meat may well be carried thereon to a refrigerator and the entire device then removed from the track and suspended in such refrigerator by means of the eye 5.

It is of course to be understood that the device is not restricted to use in any particular field, but may well be employed whenever its use will be desirable. Furthermore, the invention is not restricted to the use of the exact details and arrangement shown, but may be varied in numerous ways without departing from the spirit of the invention as claimed.

I claim:

1. In an elevated carrier, a relatively short vertical bar and a comparatively long bar parallel therewith, a track wheel mounted between the lower end of the short bar and the intermediate portion of the longer bar, the upper ends of the two bars being secured together, a vertical handle spaced outwardly from said comparatively long bar and secured at its upper end thereto, and means for securing the lower ends of said comparatively long bar and said handle together, whereby said handle forms a brace for said bar.

2. In an elevated carrier, a relatively short vertical bar and a comparatively long bar parallel therewith, a track wheel mounted between the lower end of the short bar and the intermediate portion of the longer bar, the upper ends of the two bars being secured together, a vertical handle spaced outwardly from said comparatively long bar and secured at its upper end thereto, and fastening means passing through the lower ends of said handle and bar for clamping them tightly against opposite sides of the suspending part of a load carrier.

3. In an elevated carrier, a relatively short vertical bar and a comparatively long bar parallel thereto, the upper end of the longer bar being bent laterally and secured to the upper end of the short bar, a track wheel mounted between the two bars, the lower end of said comparatively long bar being bent laterally under said wheel and then continuing vertically downward, a vertical handle spaced outwardly from said comparatively long bar and having its upper end bent laterally over said laterally bent end of this bar and secured thereto, the lower end of said handle being bent laterally under the laterally bent end of said comparatively long bar and then continuing vertically downward in parallel relation with the similarly directed lower terminal thereof, and fastening means passing through the two parallel terminals for clamping them against the suspending part of a load carrier.

In testimony whereof I have hereunto set my hand.

JOHN F. SMILEY.

Copies of this patent may be obtained for five cents each, by addressing the "Commissioner of Patents, Washington, D. C."